Patented May 11, 1954

2,678,308

UNITED STATES PATENT OFFICE 2,678,308

MODIFIED AMINOPLAST RESINS

Tzeng Jiueq Suen, Stamford, Conn., assignor to American Cyanamid Company, New York, N. Y., a corporation of Maine No Drawing. Application June 11, 1952, Serial No. 292,991

8 Claims. (Cl. 260—33.2)

This invention relates to novel molding compositions comprising urea-formaldehyde resins or melamine-formaldehyde resins modified with a compound having the general formula:

$RO[(CH_2)_nO]_m$-$CH_2$-$CHOH$-$CH_2[O(CH_2)_n]_m$-$OR$ wherein R is an alkyl group selected from the group consisting of methyl and ethyl, $n$ is an integer between 2 and 6, inclusive, and $m$ is an integer between 1 and 6, inclusive. This invention further relates to molding compositions of the class described in which the mold shrinkage and the after shrinkage of the molded article is appreciably diminished by the incorporation therein of the substituted propanes of the present invention.

One of the objects of the present invention is to produce molding compositions comprising urea-formaldehyde resins or melamine-formaldehyde resins modified by a substituted propane, such as those having the general formula:

$RO[(CH_2)_nO]_m$-$CH_2$-$CHOH$-$CH_2[O(CH_2)_n]_m$-$OR$ wherein R is an alkyl group selected from the group consisting of methyl and ethyl, $n$ is an integer between 2 and 6, inclusive, and $m$ is an integer between 1 and 6, inclusive.

A further object of the present invention is to produce molding compositions having diminished tendency to display both mold shrinkage and after shrinkage in a molded article. A further object of the present invention is to use the reaction products, as defined hereinabove, as flow promoters for resinous compositions, such as urea-formaldehyde resins, melamine-formaldehyde resins and the like. These and other objects of the present invention will be discussed more completely hereinbelow.

In the preparation of the novel compounds used in the present invention, one may react an epihalohydrin with a monoalkyl ether of a diprimary aliphatic alcohol, containing from 1–6 alkyleneoxy groups, wherein the alkyleneoxy groups contain from 2–6 carbon atoms each, and wherein the alkyl radical is a member of the group consisting of methyl and ethyl, in the presence of a salt-forming alkali.

In the preparation of the substituted propanes used in the present invention, one may react an epihalohydrin with a monoalkyl ether of a diprimary aliphatic alcohol, containing from 1 to 6 alkyleneoxy groups wherein the alkyleneoxy groups contain from 2–6 carbon atoms each and wherein the alkyl radical is a member of the group consisting of methyl and ethyl, in the presence of a salt-forming alkali.

All of the epihalohydrins may be used, namely epichlorohydrin, epibromohydrin, epiiodohydrin, and epifluorohydrin. Actually, it is preferred to use the epichlorohydrin because of its greater availability and because of its comparatively lower cost. Since the halide radical is split off, in the course of the reaction in the formation of these new compounds, to form an alkaline halide salt with the alkaline material present, it is immaterial which epihalohydrin is actually selected for use.

The monomethyl or monoethyl ethers of diprimary aliphatic alcohols which may be used in the practice of the present invention in coreaction with an epihalohydrin to produce the novel compounds of the present invention include the monomethyl ethers and the monoethyl ethers of ethylene glycol, diethylene glycol, triethylene glycol, tetraethylene glycol, pentaethylene glycol, hexaethylene glycol or the monomethyl ethers or monoethyl ethers of propanediol 1,3; butanediol 1,4; pentanediol 1,5; hexanediol 1,6; di(propanediol 1,3) structurally represented as $H[O(CH_2)_3]_2OH$ tri(propanediol 1,3), $H[O(CH_2)_3]_3OH$; tetra(propanediol 1,3) $H[O(CH_2)_3]_4OH$; penta(propanediol 1,3), $H[O(CH_2)_3]_5OH$; hexa(propanediol 1,3) $H[O(CH_2)_3]_6OH$; di(butanediol 1,4) $H[O(CH_2)_4]_2OH$; tri(butanediol 1,4)

$H[O(CH_2)_4]_3OH$ tetra(butanediol 1,4) $H[O(CH_2)_4]_4OH$; penta(butanediol 1,4) $H[O(CH_2)_4]_5OH$; hexa(butanediol 1,4) $H[O(CH_2)_4]_6OH$; di(pentanediol 1,5) $H[O(CH_2)_5]_2OH$; tri(pentanediol 1,5)

$H[O(CH_2)_5]_3OH$ tetra(pentanediol 1,5) $H[O(CH_2)_5]_4OH$
penta(pentanediol 1,5) $H[O(CH_2)_5]_5OH$
hexa(pentanediol 15) $H[O(CH_2)_5]_6OH$
di(hexanediol 1,6) $H[O(CH_2)_6]_2OH$
tri(hexanediol 1,6) $H[O(CH_2)_6]_3OH$
tetra(hexanediol 1,6) $H[O(CH_2)_6]_4OH$
penta(hexanediol 1,6), $H[O(CH_2)_6]_5OH$ and hexa(hexanediol 1,6) $[HO(CH_2)_6]_6OH$.

In order to illustrate the method of preparation of these substituted propanes generally, the following examples are set forth for the purpose of illustration only and any specific enumeration of detail set forth therein should not be interpreted as limitations on the case except as indicated in the appended claims. All parts are parts by weight.

EXAMPLE 1

*Preparation of 2-hydroxy-1,3-bis(methoxyethoxy)-propane*

463 parts of epichlorohydrin (5 mols) and 1522 parts of ethylene glycol monomethyl ether (20 mols) are mixed together in a suitable reaction chamber equipped with a stirrer, a thermometer, a dropping funnel and a reflux condenser, and the mixture is heated to 50° C. A 50% solution containing 200 parts of sodium hydroxide (5 mols) in water is slowly introduced (with stirring) over a one hour period during which time the reaction temperature is kept at about 49–51° C. The reaction is then permitted to proceed to completion in about 3 or more hours at the same temperature. Any residual alkali is then neutralized with concentrated sulfuric acid. The salt formed is filtered off and the product is subjected to fractionation under vacuum with a suitable fractionating column. After removing water and the excess of ethylene glycol, 2-hydroxy-1,3-bis(methoxyethoxy)-propane or (glycerol-α-bis-(methoxyethyl)ether is collected at 113° C. under an absolute pressure of 1.5 mm. Analysis: Found, $C=51.06\%$; $H=9.54\%$; Calculated for $C_9H_{20}O_5$, Carbon=51.94%, H=9.62%. The yield is 522 parts corresponding to about 50% of theoretical.

EXAMPLE 2

The previous example is repeated at the reaction temperature of about 80° C. The yield of 2-hydroxy-1,3-bis(methoxyethoxy)-propane is increased to about 655 parts or about 63% of theoretical.

In carrying out the reaction process, an excess of the diprimary aliphatic alcohol monoether is desirable in order to minimize the self condensation of epihalohydrin. On the other hand, too great an excess of the monoether would, of course, make the reaction mixture too bulky for convenient handling. The use of from 2–4 mols of the diprimary aliphatic alcohol monoalkyl ethers described above per mol of the epihalohydrin is the most practical range to use although this particular range of proportions is not critical. A reaction temperature of 70–100° C. is to be preferred for optimum yield.

Included amongst the compounds of the present invention are the following:

2-hydroxy-1,3-bis methoxyethoxy-propane; 2-hydroxy-1,3-bis ethoxyethoxy-propane; 2-hydroxy-1,3-bis methoxyethoxyethoxy-propane; 2-hydroxy-1,3-bis ethoxyethoxyethoxy-propane; 2-hydroxy-1,3-bis methoxyethoxyethoxyethoxyethoxyethoxy; 2-hydroxy-1,3-bis ethoxyethoxyethoxyethoxyethoxy - propane; 2 - hydroxy-1,3-bis methoxypropoxy-propane; 2-hydroxy-1,3-bis ethoxypropoxy-propane; 2-hydroxy-1,3-bis methoxypropoxypropoxy-propane; 2-hydroxy-1,3-bis ethoxypropoxypropoxy - propane; 2-hydroxy-1,3-bis methoxypropoxypropoxypropoxypropoxy-propane; 2-hydroxy-1,3-bis ethoxypropoxypropoxypropoxypropoxypropoxypropoxy - propane; 2-hydroxy-1,3 - bis methoxybutoxy-propane; 2 - hydroxy-1,3-bis ethoxy-butoxy-propane; 2-hydroxy-1,3-bis methoxybutoxybutoxy-propane; 2-hydroxy-1,3-bis ethoxybutoxybutoxy-propane; 2-hydroxy-1,3 - bis methoxybutoxybutoxybutoxybutoxybutoxy-propane; 2-hydroxy-1,3-bis ethoxybutoxybutoxybutoxybutoxybutoxy - propane; 2-hydroxy-1,3-bis methoxypentoxy-propane; 2-hydroxy-1,3-bis ethoxypentoxy-propane; 2 - hydroxy-1,3-bis methoxypentoxypentoxypentoxypentoxy-propane; 2-hydroxy-1,3-bis ethoxypentoxypentoxypentoxypentoxy-propane; 2-hydroxy-1,3-bis methoxypentoxypentoxypentoxypentoxypentoxy-propane; 2 - hydroxy - 1,3 - bis ethoxypentoxypentoxypentoxypentoxypentoxy-propane; 2-hydroxy-1,3-bis methoxyhexoxy-propane; 2-hydroxy-1,3-bis ethoxyhexoxy-propane; 2-hydroxy-1,3-bis methoxyhexoxyhexoxyhexoxy-propane; 2-hydroxy-1,3-bis ethoxyhexoxyhexoxyhexoxyhexoxyhexoxy- propane; 2-hydroxy-1,3 bis methoxyhexoxyhexoxyhexoxyhexoxyhexoxy-propane; 2-hydroxy-1,3 bis ethoxyhexoxyhexoxyhexoxyhexoxyhexoxy h e x - oxy-propane.

It has been stated hereinabove that the condensation products of the present invention may be utilized as modifiers for synthetic resinous molding compositions, such as urea-formaldehyde or melamine-formaldehyde molding powders, particularly for the purpose of reducing the amount of shrinkage of the articles molded with these molding powders. The following example is set forth to illustrate how this may be accomplished.

EXAMPLE 3

A urea-formaldehyde resin syrup is prepared in the conventional way with a mol ratio of formaldehyde to urea of 1.33:1, in which the reaction between the formaldehyde and urea is carried out at a pH of about 7.9 and at a temperature of about 30° C. for 1 hour. This reaction is continued at 50° C. until the free formaldehyde content drops to about 4.5%. 2-hydroxy-1,3-bis-(methoxyethoxy)-propane is added as a modifier. The modified resin syrup is then mixed with alpha cellulose pulp and the mixture dried and then ground with a suitable curing agent and lubricant to a fine powder. The proportion of resin solids:modifier:alpha cellulose pulp is 62:5:33. In the evaluation of the molding powder prepared as described above, a molded article showed its mold shrinkage to be 3.6 mils per inch and its after shrinkage 3.7 mils per inch. An unmodified molding powder prepared in the same manner with a resin solids to alpha cellulose pulp in a ratio of 67:33 shows a mold shrinkage of 5.5 mils per inch and an after shrinkage of 8.6 mils per inch.

The determination of the shrinkage of a molded article is accomplished in the following manner. The shrinkage of the molded article is evaluated by means of a test piece in the form of a circular disc ⅛″ thick and 4″ in diameter and is measured in terms of "mold shrinkage" and "after shrinkage." If the diameter of the cold mold cavity is denoted as A; the diameter of the molded disc after being conditioned at 25° C. and at a relative humidity of 50% for 48 hours is denoted as B; and the diameter of the disc after further conditioning for 48 hours at 220° F. and thereafter being cooled to 25° C. at a relative humidity of 50% is denoted as C; the following equations can be set up, in which the shrinkages are measured in terms of mils/inch.

$$\text{Mold shrinkage } \frac{A-B}{A} \times 1000$$

$$\text{After shrinkage } \frac{B-C}{A} \times 1000$$

$$\text{Total shrinkage } \frac{A-C}{A} \times 1000$$

These modifiers can be used with urea-formaldehyde molding powders having mol ratios different from the 1:1.33 ratio set forth hereinabove, such as mol ratios of 1:1–1:3, urea to formaldehyde, respectively. These modifiers can be used additionally to modify melamine-formaldehyde resins having mol ratios of melamine to formaldehyde within the range of 1:1 to 1:6, respectively, but preferably within the range of 1:1.5 to 1:3, respectively.

The substituted propanes of the present invention may be incorporated into the resinous material in amounts varying between about 2% and 15% by weight, based on the total weight of resin and modifier. Preferably, one could use between about 5% and 10% by weight, based on the total weight of the resin and the modifier.

I claim:

1. A molding composition comprising an aminoplast resin selected from the group consisting of a melamine-formaldehyde resin and a urea-formaldehyde resin and between about 2% and 15% by weight of a compound having the general formula:

$$RO[(CH_2)_nO]_m\text{-}CH_2\text{-}CHOH\text{-}CH_2[O(CH_2)_n]_mOR$$

wherein R is an alkyl radical selected from the group consisting of methyl and ethyl, $n$ is an integer between 2 and 6, inclusive, and $m$ is an integer between 1 and 6, inclusive.

2. A molding composition comprising a urea-formaldehyde resin and between about 2% and 15% by weight of a compound having the general formula:

$$RO[(CH_2)_nO]_m\text{-}CH_2\text{-}CHOH\text{-}CH_2[O(CH_2)_n]_mOR$$

wherein R is an alkyl radical selected from the group consisting of methyl and ethyl, $n$ is an integer between 2 and 6, inclusive, and $m$ is an integer between 1 and 6, inclusive.

3. A molding composition comprising a urea-formaldehyde resin and between about 2% and 15% by weight of 2-hydroxy-1,3-bis(methoxyethoxy)-propane.

4. A molding composition comprising a melamine-formaldehyde resin and between about 2% and 15% by weight of 2-hydroxy-1,3-bis(methoxyethoxy)-propane.

5. A molding composition comprising a urea-formaldehyde resin and between about 2% and 15% by weight of 2-hydroxy-1,3-bis(methoxyethoxy)-propane.

6. A molding composition comprising a melamine-formaldehyde resin and between about 2% and 15% by weight of 2-hydroxy-1,3-bis(ethoxyethoxy)-propane.

7. A molding composition comprising a urea-formaldehyde resin and between about 2% and 15% by weight of 2-hydroxy-1,3-bis(ethoxyethoxyethoxy)-propane.

8. A molding composition comprising a melamine-formaldehyde resin and between about 2% and 15% by weight of 2-hydroxy-1,3-bis(ethoxyethoxyethoxy)-propane.

No references cited.